United States Patent

Yamamoto et al.

[11] Patent Number: 4,792,585
[45] Date of Patent: Dec. 20, 1988

[54] THERMOPLASTIC RESIN COMPOSITION

[75] Inventors: Kazuhiko Yamamoto, Yokkaichi; Kenji Nobuhara, Suzuka; Hodaka Mizuno, Yokkaichi; Atsuko Yanagawa, Mie, all of Japan

[73] Assignee: Japan Synthetic Rubber Co., Ltd., Tokyo, Japan

[21] Appl. No.: 127,047

[22] Filed: Dec. 1, 1987

[30] Foreign Application Priority Data

Dec. 10, 1986 [JP] Japan ................ 61-294526

[51] Int. Cl.$^4$ ............................................. C08L 69/00
[52] U.S. Cl. ......................................... 525/67; 525/71; 525/146
[58] Field of Search ................ 525/67, 146, 69, 71, 525/468

[56] References Cited

U.S. PATENT DOCUMENTS 4,204,047  5/1980  Margotte et al. ................ 525/67
4,560,725  12/1985  Van Bokhoven et al. ........ 525/67

Primary Examiner—Theodore E. Pertilla
Attorney, Agent, or Firm—Oblon, Fisher, Spivak, McClelland & Maier

[57] ABSTRACT

A thermoplastic resin composition consisting essentially of:

(A) 20 to 80% by weight of a polycarbonate having a viscosity-average molecular weight of 14,000 to 27,000, (B) 10 to 70% by weight of a maleimide resin obtained by polymerizing 95 to 35 parts by weight of a monomer mixture consisting of 10 to 70% by weight of a maleimide compound, 25 to 80% by weight of an aromatic alkenyl compound, 5 to 40% by weight of an alkenyl cyanide compound and optionally 50% by weight or less of a monomer copolymerizable therewith, in the presence of 5 to 65 parts by weight of at least one rubber-like polymer selected from the group consisting of an ethylene-propylene-nonconjugated diene rubber, an ethylene-propylene rubber and an acrylic rubber, and (C) 5 to 70% by weight of a styrene resin obtained by polymerizing 95 to 20 parts by weight of a monomer mixture consisting of 5 to 40% by weight of an alkenyl cyanide compound, 10 to 95% by weight of an aromatic alkenyl compound and optionally 0 to 70% by weight of at least one other alkenyl monomer copolymerizable with said compounds, in the presence of 5 to 80 parts by weight of a rubbery polymer. Said resin composition is excellent in balance of properties in respect of heat resistance, moldability, impact resistance and chemical resistance and is suitable for use in automobile parts, electric appliances, household articles, industrial articles, etc.

6 Claims, 1 Drawing Sheet

THERMOPLASTIC RESIN COMPOSITION

This invention relates to a thermoplastic resin composition excellent in heat resistance, moldability and impact resistance and particularly in chemical resistance. More particularly, this invention relates to a thermoplastic resin composition consisting essentially of a polycarbonate, a maleimide resin and a styrene resin.

With the recent diversification of their application fields, resin moldings tend to be more complicated and large-sized. In order to respond thereto, the need for highly functional resins has increased. As such highly functional resins, engineering plastics such as polycarbonates and the like have heretofore been used.

It is widely known that polycarbonates have excellent impact resistance and heat resistance. However, they have a high melt viscosity and hence are inferior in moldability.

In order to solve the problem of polycarbonates in respect of molding, there have already been proposed, for example, a composition obtained by mixing a polycarbonate with a rubber-reinforced styrene resin [see Japanese Patent Application Kokai (Laid-Open) No. 41447/74] and a composition obtained by mixing a polycarbonate with an acrylate-based rubbery polymer [see Japanese Patent Application Kokai (Laid-Open) No. 12946/77].

These compositions are superior in heat resistance, impact resistance and moldability, but inferior in chemical resistance and kerosene resistance. Thus, they do not have sufficient performance for use as a functional resin.

As a result of extensive study, the present inventors have found that thermoplastic resin compositions having the desired physical properties can be obtained by mixing a polycarbonate, a maleimide resin and a styrene resin in specific proportions.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

Figure 1:
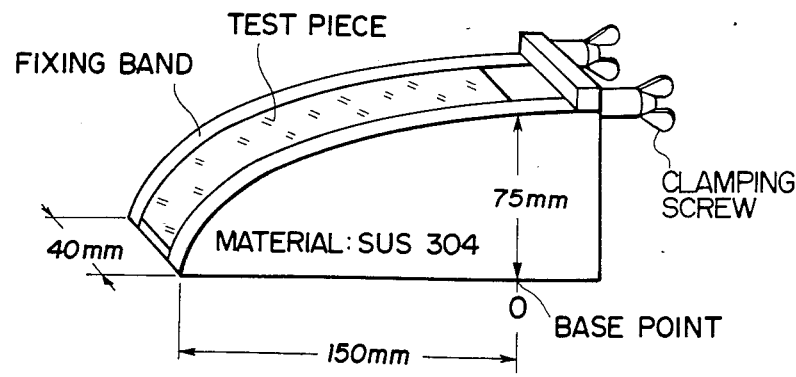
FIG. 1 is an apparatus which tests the oil resistance of the present thermoplastic resin composition.

According to this invention, there is provided a thermoplastic resin composition consisting essentially of:

(A) 20 to 80% by weight of a polycarbonate having a viscosity-average molecular weight of 14,000 to 27,000, (B) 10 to 70% by weight of a maleimide resin obtained by polymerizing 95 to 35 parts by weight of a monomer mixture consisting of 10 to 70% by weight of a maleimide compound, 25 to 80% by weight of an aromatic alkenyl compound, 5 to 40% by weight of an alkenyl cyanide compound and optionally 50% by weight or less of a monomer copolymerizable therewith, in the presence of 5 to 65 parts by weight of at least one rubber-like polymer selected from the group consisting of an ethylene-propylene-nonconjugated diene rubber, an ethylene-propylene rubber and an acrylic rubber, and (C) 5 to 70% by weight of a styrene resin obtained by polymerizing 95 to 20 parts by weight of a monomer mixture consisting of 5 to 40% by weight of an alkenyl cyanide compound, 10 to 95% by weight of an aromatic alkenyl compound and optionally 0 to 70% by weight of at least one other alkenyl monomer copolymerizable therewith, in the presence of 5 to 80 parts by weight of a rubbery polymer.

The thermoplastic resin composition of this invention can be obtained by mixing (A) a polycarbonate, (B) a maleimide resin and (C) a styrene resin in the specific proportions.

(A) Polycarbonate

The polycarbonate (A) used in this invention includes aromatic polycarbonates, aliphatic polycarbonates, aliphatic-aromatic polycarbonates, etc. As the polycarbonate, there may generally be used a polymer or copolymer derived from a bisphenol such as 2,2-bis(4-oxyphenyl)alkane, bis(4-oxyphenyl)ether, bis(4-oxyphenyl)sulfone sulfide or sulfoxide or the like. For some purposes, there may be used a polymer derived from a halogen-substituted bisphenol. The type of polycarbonate, the method of producing polycarbonate, and the like are described in detail in "Polycarbonate Resins" published by The Nikkan Kogyo Shimbun, Ltd. on Sept. 30, 1969.

The molecular weight of the polycarbonate is generally 14,000 to 27,000, preferably 15,000 to 26,000, in terms of viscosity-average molecular weight (Mv). When the viscosity-average molecular weight is less than 14,000, the thermoplastic resin composition of this invention has low impact resistance. When the molecular weight is more than 27,000, the moldability of the composition is deteriorated. The viscosity-average molecular weight of the polycarbonate was determined by firstly measuring a viscosity of a solution of the polycarbonate in methylene chloride, at 20° C. using an Ubbellohde's viscometer and then calculating according to the following Schnell's viscosity equation [H. Schnell: Angewandte Chemie 68 633 (1956)]:

$$[\eta] = 1.23 \times 10^{-4} \overline{M}_v^{0.83}$$

The content of the polycarbonate in the composition of this invention is 20 to 80% by weight, preferably 30 to 70% by weight. When the content exceeds 80% by weight, the moldability of the composition is deteriorated. When the content is less than 20% by weight, the heat resistance of the composition becomes low.

(B) Maleimide resin

The maleimide resin (B) used in this invention is obtained by polymerizing 95 to 35 parts by weight of a monomer mixture consisting of 10 to 70% by weight of a maleimide compound, 25 to 80% by weight of an aromatic alkenyl compound, 5 to 40% by weight of an alkenyl cyanide compound and optionally 50% by weight or less of a monomer copolymerizable therewith, in the presence of 5 to 65 parts by weight of at least one rubber-like polymer having an average particle diameter of 0.1 to 2 microns, preferably 0.15 to 1.5 microns, selected from the group consisting of an ethylene-propylene-nonconjugated diene rubber (EPDM), an ethylene-propylene rubber (EPR) and an acrylic rubber. The average particle diameter of the rubber-like polymer component dispersed in the copolymer produced is preferably 0.1 to 2 microns.

Rubber-like polymer

The rubber-like polymer used in the production of the maleimide resin (B) is selected from the group consisting of an ethylene-propylene-nonconjugated diene rubber (EPDM), an ethylene-propylene rubber (EPR) and an acrylic rubber. These rubbers may be commercially available ones. They may be used alone or in combination of two or more. Of these rubbers, EPDM and EPR are particularly preferred. When these rubber-like polymers are used, it follows that their dispersed particles contain grafted components therein, whereby the thermoplastic resin composition can be improved in impact resistance and chemical resistance (kerosene resistance). The amount of the rubber-like polymer used is generally 5 to 65 parts by weight, preferably 10 to 60 parts by weight, particularly preferably 10 to 55 parts by weight. When the amount is less than 5 parts by weight, the impact resistance of the resulting composition is low, and when the amount is more than 65 parts by weight, the moldability of the composition is deteriorated. The average particle diameter of the rubber-like polymer component dispersed in the copolymer produced is preferably 0.1 to 2 microns, more preferably 0.15 to 1.5 microns. When the diameter is less than 0.1 micron, the improvement in impact resistance of the resulting composition tends to be small. When the diameter exceeds 2 microns, the appearance or gloss of the molded article of the composition tends to be deteriorated.

The particle diameters of the rubber-like polymer dispersed in the copolymer produced can be determined by observing a section of pieces obtained by cutting pellets or molded articles of the thermoplastic resin composition by means of a microtome using an electron microscope. The average particle diameter is calculated using the following equation:

*Average particle diameter* $(\overline{R}) = \Sigma n_i R_i / \Sigma n_i$ wherein $n_i$ is the number of dispersed particles and $R_i$ is the diameter of the $n_i$ particle.

The dispersed particles of the rubber-like polymer are not truly spherical when observed through an electron microscope. Therefore, the particle diameter of a particle is taken as the average of the largest diameter and the smallest diameter.

Control of the average particle diameter of the rubber-like polymer component in the copolymer product can generally be conducted by controlling the speed of stirring during polymerization. It is possible to use, as a part of the rubber-like polymer, up to 30% by weight, preferably up to 10% by weight of a rubber other than an ethylene-propylene-nonconjugated diene rubber (EPDM), an ethylene-propylene rubber (EPR) and an acrylic rubber. However, use of a larger amount of a diene rubber such as a polybutadiene rubber results in a reduction of the chemical resistance of the resulting thermoplastic resin composition.

Maleimide compound

The maleimide compound used in this invention includes, for example, maleimide, N-methylmaleimide, N-ethylmaleimide, N-phenylmaleimide, N-o-chlorophenylmaleimide, N-cyclohexylmaleimide, etc. Particularly preferred are N-phenylmaleimide, N-o-chlorophenylmaleimide and N-cyclohexylamleimide. They may be used alone or in combination of two or more.

The amount of the maleimide compound used is generally 10 to 70% by weight, preferably 15 to 65% by weight, based on the weight of the monomer mixture. When the amount is less than 10% by weight, the oil resistance of the resulting composition is deteriorated. When the amount is more than 70% by weight, the moldability of the composition has deteriorated.

Aromatic alkenyl compound

The aromatic alkenyl compound includes styrene, alpha-methyl styrene, methylstyrene, monobromostyrene, dibromostyrene, etc. They may be used alone or in combination of two or more. Preferred are styrene and alphamethylstyrene.

The amount of the aromatic alkenyl compound used is generally 25 to 80% by weight, preferably 30 to 75% by weight. When the amount is less than 25% by weight, the moldability of the resulting composition is deteriorated. When the amount is more than 80% by weight, the heat resistance of the composition is reduced.

Alkenyl cyanide compound

The alkenyl cyanide compound includes acrylonitrile and methacrylonitrile. It is used in an amount of 5 to 40% by weight, preferably 10 to 35% by weight. When the amount is less than 5% by weight, the kerosene resistance of the resulting composition is deteriorated. When the amount is more than 40% by weight, the moldability of the composition is deteriorated.

Other copolymerizable monomer

Together with the above-mentioned essential components, other copolymerizable monomers can also be copolymerized. Such other monomers include methacrylic acid esters such as methyl methacrylate, ethyl methacrylate and the like; unsaturated acid anhydrides such as maleic anhydride, itaconic anhydride and the like; and so forth. They may be used alone or in combination of two or more. The amount of the monomer used is up to 50% by weight, preferably up to 30% by weight, more preferably up to 20% by weight.

Preferred specific combinations of the above monomers are:

(1) maleimide compound-styrene-acrylonitrile
(2) maleimide compound-styrene-acrylonitrile-methyl methacrylate.

In these combinations, the styrene may be partly or wholly replaced by alpha-methylstyrene to give a maleimide copolymer having higher heat resistance. Also, flame retardancy can be imparted to the maleimide copolymer by substituting a halogenated styrene for a part or the whole of styrene.

Polymerization

Bulk polymerization, solution polymerization, suspension polymerization, emulsion polymerization and the like are suitable for the production of a maleimide resin [the (B) component]. The polymerization catalyst which can be used in the polymerization may be a peroxide, an azo compound or the like as employed in the radical polymerization of general vinyl monomers. The polymerization temperature is preferably from room temperature to 350° C., more preferably from 40° to 300° C.

Specifically, the polymerization is conducted at a temperature ranging from room temperature to 350° C., preferably from 100° to 300° C., using a polymerization catalyst such as a tertiary amine or the like.

Since in the case of emulsion polymerization, a rubber latex is used as the base rubber-like polymer component, the average particle diameter of the rubber-like component in the maleimide resin (B) may be controlled by adjusting the diameters of the rubber-like polymer particles in the rubber latex. In the case of bulk polymerization, suspension polymerization or solution polymerization, the average particle diameter of the rubber-like polymer component in the maleimide resin (B) can be controlled by adjusting the viscosity of the rubber-like polymer solution by changing the solvent type and the monomer amount, or controlled by appropriately adjusting the stirring speed during polymerization. In general, the lower the solution viscosity and the faster the stirring speed, the smaller the diameter of the rubber-like polymer particles dispersed in the maleimide resin.

Amount of maleimide resin (B)

The amount of the maleimide resin (B) in the thermoplastic resin composition of this invention is 10 to 70% by weight, preferably 15 to 65% by weight. When the amount is less than 10% by weight, the heat resistance and chemical resistance of the resulting composition are low. When the amount is more than 70% by weight, the moldability and impact resistance of the composition are deteriorated.

(C) Styrene resin

The styrene resin(C) used in the thermoplastic resin composition of this invention is obtained by polymerizing a monomer mixture (resin constituents) consisting of an aromatic alkenyl compound, an alkenyl cyanide compound and optionally at least one other alkenyl monomer copolymerizable therewith, in the presence of a rubbery polymer.

Rubbery polymer

The rubbery polymer includes ethylene-alphaolefin copolymers such as ethylene-propylene random or block copolymer, ethylene-butene random or block copolymer and the like; ethylene-unsaturated carboxylic acid ester copolymers such as ethylene-methyl acrylate copolymer, ethylene-butyl acrylate copolymer and the like; ethylene-vinyl ester of fatty acid copolymers such as ethylene-vinyl acetate copolymer and the like; ethylene-propylene-nonconjugated diene terpolymers such as ethylene-propylene-hexadiene terpolymer and the like; diene rubbers such as polybutadiene, styrene-butadiene random or block copolymer, acrylonitrile-butadiene copolymer, butadiene-isoprene copolymer and the like; butylene-isoprene copolymer; acrylic rubber; chloroprene rubber; and so forth. They may be used alone or in combination of two or more.

Of the above rubbery polymers, ethylene-propylene-nonconjugated diene terpolymers, acrylic rubber and diene rubbers are preferred in view of impact resistance and other aspects. More preferable are polybutadiene and styrene-butadiene copolymer. The styrene content in the styrene-butadiene copolymer is preferably 50% by weight or less.

The rubbery polymer is used in an amount of 5 to 80 parts by weight, preferably 10 to 70 parts by weight. When the amount is less than 5 parts by weight, the impact resistance of the resulting composition becomes low. When the amount is more than 80 parts by weight, the heat resistance of the composition is deteriorated.

Alkenyl cyanide compound

The alkenyl cyanide compound includes acrylonitrile, methacrylonitrile, etc. Acrylonitrile is preferred.

The alkenyl cyanide compound is used in an amount of 5 to 40% by weight, preferably 10 to 35% by weight, based on the weight of the monomer mixture. When the amount is less than 5% by weight, the kerosene resistance of the resulting composition is deteriorated. When the amount is more than 40% by weight, the moldability of the composition is deteriorated.

Aromatic alkenyl compound

The aromatic alkenyl compound includes styrene, alpha-methylstyrene, methylstyrene, vinylxylene, monochlorostyrene, dichlorostyrene, monobromostyrene, dibromostyrene, p-tert-butylstyrene, ethylstyrene, vinylnaphthalene, o-methylstyrene, p-methylstyrene, dimethylstyrene, etc. They can be used alone or in combination of two or more. Of these, styrene and alpha-methylstyrene are preferred. It is preferable that styrene be used in an amount of at least 50% by weight when two or more aromatic alkenyl compounds are used in combination.

The aromatic alkenyl compound is generally used in an amount of 5 to 95% by weight, preferably 10 to 85% by weight, more preferably 10 to 80% by weight. When the amount is less than 5% by weight, the moldability of the resulting composition is deteriorated. When the amount is more than 95% by weight, the heat resistance of the composition is deteriorated.

Other copolymerizable alkenyl monomers

Other alkenyl monomers copolymerizable with the aromatic alkenyl compound and the alkenyl cyanide compound include alkyl acrylates such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate and the like; aryl acrylates such as phenyl acrylate, benzyl acrylate and the like; alkyl methacrylates such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate and the like; aryl methacrylates such as phenyl methacrylate, benzyl methacrylate and the like; unsaturated acids such as maleic anhydride, itaconic anhydride, citraconic anhydride and the like; and so forth. They can be used alone or in combination of two or more.

Said other copolymerizable monomers are incorporated into the monomer mixture (the resin constituents) in an amount of 70% by weight or less, preferably 50% by weight or less, more preferably 30% by weight or less.

Polymerization

The styrene resin (C) can be produced by graft-polymerization, that is, polymerizing a monomer mixture consisting of an aromatic alkenyl compound, an alkenyl cyanide compound and other monomers copolymerizable with said compounds, in the presence of a rubbery polymer. The polymerization is conducted according to bulk polymerization, solution polymerization, suspension polymerization, emulsion polymerization or their combination.

This polymerization is usually a radical polymerization and uses a catalyst such as an azo compound, a peroxide or the like. The polymerization temperature is usually from room temperature to 250° C., preferably 40° to 180° C.

Amount of styrene resin (C)

The amount of the styrene resin (C) in the thermoplastic resin composition of this invention is 5 to 70% by weight, preferably 10 to 65% by weight. When the amount is less than 5% by weight, the impact resistance of the resulting composition is deteriorated. When the amount is more than 70% by weight, the heat resistance of the composition is deteriorated.

The thermoplastic resin composition of this invention can be produced by one of the following methods:

(1) Each component is separately dissolved in and swollen with an organic solvent, the resulting solutions are mixed and the resulting mixture is then dried.

(2) All components are mixed using a mixer or the like, and the resulting mixture is subjected to melt mixing by an extruder and then pelletized.

(3) A non-solvent is added to the solution obtained in (1) above, and the resulting particles are collected, subjected to melt mixing by an extruder and then pelletized.

(4) The pellets or particles obtained in the above (1), (2) or (3) are mixed with one another in the presence or absence of additional components.

A known mixing apparatus such as a Banbury mixer, a kneader or the like can be used in the above methods.

A thermoplastic resin composition may be obtained by further adding, to the present thermoplastic resin composition, other thermoplastic resins, for example, polyphenylene ether, polyamide, acrylic resin or other polymers, and melt mixing the resulting mixture by an extruder.

The thermoplastic resin composition of this invention can be subjected to injection molding, sheet extrusion, vacuum forming, profile molding, foam molding or the like to obtain a desired shaped article.

With thermoplastic resin composition of this invention can be incorporated, prior to the actual use, various known additives which are conventionally used such as an antioxidant, an ultraviolet absorber, a lubricant, a flame retardant, an antistatic agent, a foaming agent, a glass fiber and the like.

The thermoplastic resin composition of this invention is excellent in balance of properties in respect of heat resistance, moldability, impact resistance and chemical resistance, and accordingly, is an excellent molding material which has been freed from the drawbacks of conventional polycarbonate-ABS resin compositions.

In the following Examples and Comparative Examples, parts and % are by weight.

EXAMPLES 1 TO 9 AND COMPARATIVE EXAMPLES 1 TO 14

Production of Maleimide Resin (B)

Into a reactor having an internal volume of 30 liters equipped with ribbon-shaped blades were charged a base rubber (the rubber-like polymer component), N-phenylmaleimide and acrylonitrile as shown in Table 1, and 100 parts of toluene. They were stirred at 50° C. until the rubber-like polymer component and the N-phenylmaleimide were dissolved completely. Thereto were added the remaining monomer or monomers 0.1 part of t-dodecylmercaptan and 0.4 part of benzoyl peroxide. The mixture was polymerized for 2 hours at 100° C. and then for a further 3 hours at 120° C., when the polymerization was substantially completed. Thereafter, the solvent was removed by steam distillation and the residue was ground and dried to obtain a maleimide resin. The diameters of the particles of the base rubber (the rubber-like polymer) dispersed in the maleimide resin were measured to obtain the result shown in Table 1.

Production of Styrene Resin (C)

Into an autoclave equipped with a stirrer was charged a monomer mixture as shown in Table 1, in an amount as shown in Table 1. Also, 100 parts of methyl ethyl ketone was charged together with small pieces of a base rubber (a rubbery polymer component) in an amount as shown in Table 1. They were stirred for 24 hours at room temperature to dissolve the rubber. The atmosphere in the autoclave was replaced with nitrogen and the resulting solution was heated to 85° C. While keeping the temperature at 85° C., a solution of 0.075 part of benzoyl peroxide and 0.075 part of azobisisobutyronitrile in 250 parts of methyl ethyl ketone was continuously added over 8 hours, after which the temperature was kept at 85° C. for a further 3 hours, to obtain a styrene resin.

Production of thermoplastic resin composition

A polycarbonate having a viscosity-average molecular weight as shown in Table 1 (A2200 grade having a viscosity-average molecular weight of 21,600, A2500 grade having a viscosity-average molecular weight of 23,200 or A3000 grade having a viscosity-average molecular weight of 28,100, all manufactured by Idemitsu Petrochemical, Co., Ltd.) was mixed with the maleimide resin (B) obtained above and the styrene resin (C) obtained above in the proportions shown in Table 1. The resulting mixture was extruded at 260° C. using a biaxial kneader to obtain pellets. The pellets were dried thoroughly and then molded at 240° C. using an injection machine to obtain test pieces. These test pieces were measured for the following properties according to the following test methods, to obtain the results shown in Table 1:

1. Heat resistance (heat deformation temperature)
   Measured at 264 psi according to ASTM D 648 using a test piece of ⅛" in thickness.
2. Impact resistance (Izod impact strength)
   Measured according to ASTM D 256 using a notched test piece of ¼" in thickness.
3. Moldability (melt flow rate)
   Measured at 240° C. and 10 kg according to JIS K 7210.
4. Chemical resistance (oil resistance)
   Evaluated based on critical strain.
4-1. Apparatus
   (1) ¼ Ellipse-shaped testing apparatus
      A ¼ ellipse-shaped testing apparatus as shown in FIG. 1, provided with a means for fixing a test piece was used.
   (2) Desiccator
   (3) Thermostat
4-2. Preparation of test piece
   (1) A press-molded sheet is used.
   (2) The standard thickness of the sheet is 2 mm.

(3) The sheet is cut into a size of about 40 mm in width and about 160 mm in length. The length is adapted to the length of the testing apparatus.

Figure 2:
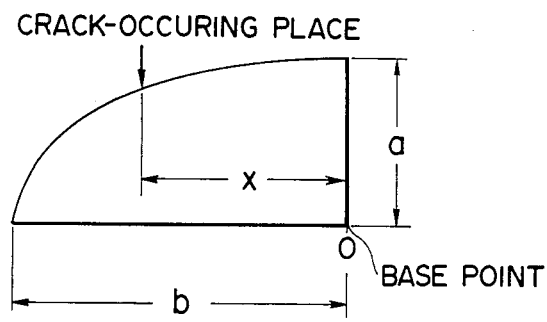
FIG. 2 shows the places at which the dimensions are measured which are required to calculate critical strain as an indication of oil resistance.

4-3. Test method (1) After the test piece was mounted on the testing apparatus, the apparatus was immersed in kerosene.
(2) The apparatus was allowed to stand for 24 hours at 5° C.
(3) Then, the place on the test piece at which a crack occurred was visually detected and given a mark.
(4) The distance (x) of the crack-occurring place from the ellipse center (base point in FIG. 2) shown in FIG. 2 was measured.

(5) A critical strain was calculated using the following equation:

$$\epsilon(\%) = (b/2a^2)[1 - (a^2 - b^2) \times x^2/a^4]^{3/2} \times t \times 100$$

Wherein $\epsilon$ = critical strain (%), a = half of the major axis of the ellipse (mm), b = half of the minor axis of the ellipse (mm), x = distance (mm) from the ellipse center to the crack-occurring place, and t = thickness (mm) of a sample. In the above equation, a, b and x are values of a, b, x shown in FIG. 2, respectively.

TABLE 1

| | Examples | | | | | | | | | | | Comparative Examples | |
|---|---|---|---|---|---|---|---|---|---|---|---|---|---|
| | 1 | 2 | 3 | 4 | 5 | 6 | 7 | 8 | 9 | 10 | 11 | 1 | 2 |
| Polycarbonate (A) | | | | | | | | | | | | | |
| Viscosity-average m.w. 21,600 (parts by weight) | 50 | 25 | 70 | 50 | 50 | 50 | 50 | 50 | | 50 | 50 | 10 | 85 |
| Viscosity-average m.w. 23,200 (Parts by weight) | | | | | | | | | 50 | | | | |
| Viscosity-average m.w. 28,100 (parts by weight) | | | | | | | | | | | | | |
| Maleimide resin (B) (parts by weight) | 20 | 45 | 20 | 15 | 20 | 20 | 35 | 20 | 20 | 20 | 40 | 60 | 10 |
| Base rubber | | | | | | | | | | | | | |
| EPDM (parts by weight) | 20 | 20 | 20 | | 20 | 20 | 20 | 20 | 20 | | 10 | 20 | 20 |
| EPR (parts by weight) | | | | 40 | | | | | | | | | |
| BR (parts by weight) | | | | | | | | | | | | | |
| Acrylic rubber (parts by weight) | | | | | | | | | | 20 | | | |
| Average particle diameter (μ) | 0.25 | 0.25 | 0.25 | 0.33 | 0.26 | 0.27 | 0.25 | 0.25 | 0.25 | 0.20 | 0.23 | 0.25 | 0.25 |
| Maleimide compound (parts by weight) | 15 | 15 | 15 | 20 | 20 | 20 | 15 | 15 | 15 | 15 | 40 | 15 | 15 |
| N—phenylmaleimide | | | | | | | | | | | | | |
| Other monomers | | | | | | | | | | | | | |
| Styrene (parts by weight) | 49 | 49 | 49 | 21 | | 35 | 49 | 49 | 49 | 50 | 40 | 49 | 49 |
| alpha-Methylstyrene (parts by weight) | | | | | 45 | | | | | | | | |
| Acrylonitrile (parts by weight) | 16 | 16 | 16 | 19 | 15 | 20 | 16 | 16 | 16 | 15 | 10 | 16 | 16 |
| Methyl methacrylate (parts by weight) | | | | | | 5 | | | | | | | |
| Styrene resin (C) (parts by weight) | 30 | 20 | 20 | 35 | 30 | 30 | 15 | 30 | 30 | 30 | 10 | 30 | 5 |
| Base rubber | | | | | | | | | | | | | |
| BR (parts by weight) | 40 | 40 | 40 | 40 | 40 | 40 | 40 | | 40 | 40 | 40 | 40 | 40 |
| EPDM (parts by weight) | | | | | | | | 30 | | | | | |
| Monomers | | | | | | | | | | | | | |
| Styrene (parts by weight) | 42 | 42 | 42 | 42 | 42 | 42 | | 49 | 42 | 42 | 42 | 42 | 42 |
| alpha-Methylstyrene (parts by weight) | | | | | | | 40 | | | | | | |
| Acrylonitrile (parts by weight) | 18 | 18 | 18 | 18 | 18 | 18 | 15 | 21 | 18 | 18 | 18 | 18 | 18 |
| Methyl methacrylate (parts by weight) | | | | | | | 5 | | | | | | |
| Physical properties | | | | | | | | | | | | | |
| Thermal deformation temperature (°C.) | 110 | 105 | 120 | 109 | 114 | 108 | 112 | 108 | 111 | 108 | 116 | 97 | 124 |
| Melt flow rate (g/10 min) 240° C. | 13 | 12 | 10 | 10 | 10 | 12 | 12 | 14 | 10 | 17 | 11 | 8 | 5 |
| Izod impact strength (kg · cm/cm) | 27 | 24 | 34 | 28 | 28 | 29 | 24 | 28 | 32 | 25 | 25 | 14 | 11 |
| Kerosene resinstance (%) | 0.71 | 0.75 | 0.69 | 0.67 | 0.68 | 0.58 | 0.69 | 0.71 | 0.70 | 0.67 | 0.65 | 0.65 | 0.60 |

| | Comparative Examples | | | | | | | | | | | |
|---|---|---|---|---|---|---|---|---|---|---|---|---|
| | 3 | 4 | 5 | 6 | 7 | 8 | 9 | 10 | 11 | 12 | 13 | 14 |
| Polycarbonate (A) | | | | | | | | | | | | |
| Viscosity-average m.w. 21,600 (parts by weight) | 75 | 20 | 80 | 15 | 50 | 50 | 50 | 50 | 50 | | 50 | 50 |
| Viscosity-average m.w. 23,200 (Parts by weight) | | | | | | | | | | | | |
| Viscosity-average m.w. 28,100 (parts by weight) | | | | | | | | | | 50 | | |
| Maleimide resin (B) (parts by weight) | 5 | 75 | 20 | 10 | 20 | 20 | 20 | 40 | 20 | 20 | 20 | 20 |
| Base rubber | | | | | | | | | | | | |
| EPDM (parts by weight) | 20 | 20 | 20 | 20 | | 20 | | 20 | 20 | 20 | 20 | 15 |
| EPR (parts by weight) | | | | | | | | | | | | |
| BR (parts by weight) | | | | | 40 | | | | | | | |
| Acrylic rubber (parts by weight) | | | | | | | | | | | | |
| Average particle diameter (μ) | 0.25 | 0.25 | 0.25 | 0.25 | 0.52 | 0.08 | | 0.26 | 0.25 | 0.25 | 0.25 | 0.27 |
| Maleimide compound (parts by weight) | 15 | 15 | 15 | 15 | 15 | 15 | 15 | 5 | 15 | 15 | 15 | 75 |
| N—phenylmaleimide | | | | | | | | | | | | |
| Other monomers | | | | | | | | | | | | |
| Styrene (parts by weight) | 49 | 49 | 49 | 49 | 25 | 49 | 60 | 55 | 49 | 49 | 49 | 5 |
| alpha-Methylstyrene (parts by weight) | | | | | | | | | | | | |
| Acrylonitrile (parts by weight) | 16 | 16 | 16 | 16 | 20 | 16 | 25 | 20 | 16 | 16 | 16 | 5 |
| Methyl methacrylate (parts by weight) | | | | | | | | | | | | |
| Styrene resin (C) (parts by weight) | 20 | 5 | 0 | 75 | 30 | 30 | 30 | 10 | 30 | 30 | 30 | 30 |
| Base rubber | | | | | | | | | | | | |
| BR (parts by weight) | 40 | 40 | 40 | 40 | 40 | 40 | 40 | 40 | 40 | 40 | | 40 |
| EPDM (parts by weight) | | | | | | | | | | | | |
| Monomers | | | | | | | | | | | | |
| Styrene (parts by weight) | 42 | 42 | 42 | 42 | 42 | 42 | 42 | 42 | 55 | 42 | 40 | 42 |

TABLE 1-continued

| | | | | | | | | | | | | |
|---|---|---|---|---|---|---|---|---|---|---|---|---|
| alpha-Methylstyrene (parts by weight) | | | | | | | | | | | 30 | |
| Acrylonitrile (parts by weight) | 18 | 18 | 18 | 18 | 18 | 18 | 18 | 18 | 5 | 18 | 25 | 18 |
| Methyl methacrylate (parts by weight) | | | | | | | | | | | 5 | |
| Physical properties | | | | | | | | | | | | |
| Thermal deformation temperature (°C.) | 112 | 111 | 122 | 92 | 109 | 109 | 110 | 104 | 109 | 110 | 112 | 116 |
| Melt flow rate (g/10 min) 240° C. | 16 | 4 | 7 | 14 | 12 | 12 | 11 | 13 | 14 | 5 | 10 | 8 |
| Izod impact strength (kg · cm/cm) | 19 | 5 | 4 | 12 | 25 | 7 | 19 | 20 | 3 | 35 | 5 | 24 |
| Kerosene resinstance (%) | 0.35 | 0.60 | 0.55 | 0.47 | 0.36 | 0.61 | 0.35 | 0.42 | 0.31 | 0.70 | 0.56 | 0.45 |

As seen from Table 1, Comparative Examples 1 to 14 gave the following results:

In Comparative Examples 1 and 2, the polycarbonate amount is outside the range of this invention. Therefore, the composition of Comparative Example 1 has low heat resistance and the composition of Comparative Example 2 has low fluidity.

In Comparative Examples 3 and 4, the maleimide resin amount is outside the range of this invention. Therefore, the composition of Comparative Example 3 has poor chemical resistance and the composition of Comparative Example 4 has low fluidity and low impact resistance.

In Comparative Examples 5 and 6, the styrene resin amount is outside the range of this invention. Therefore, the composition of Comparative Example 5 has low impact resistance and the composition of Comparative Example 6 has low heat resistance and low impact resistance.

The composition of Comparative Example 7 which contains a polybutadiene as a rubber in the maleimide resin has poor chemical resistance.

In Comparative Example 8, the diameters of particles of the rubber in the maleimide resin are outside (smaller than) the range of this invention. Accordingly, the composition has low impact resistance.

The composition of Comparative Example 9 contains a maleimide resin free of the rubbery polymer and has poor chemical resistance.

The composition of Comparative Example 10 contains a maleimide resin having a low maleimide content and has poor heat resistance and poor chemical resistance.

The composition of Comparative Example 14 contains a maleimide resin having a high maleimide content and a low acrylonitrile content and has poor fluidity and poor chemical resistance.

The composition of Comparative Example 11 contains a styrene resin having a low acrylonitrle content and has poor chemical resistance.

The composition of Comparative Example 13 contains a styrene resin free of the rubbery polymer and has low impact resistance.

The composition of Comparative Example 12 contains a polycarbonate having a large molecular weight and has poor fluidity.

What is claimed is:

1. A thermoplastic resin composition consisting essentially of:
   (A) 20 to 80% by weight of a polycarbonate having a viscosity-average molecular weight of 14,000 to 27,000,
   (B) 10 to 70% by weight of a maleimide resin obtained by polymerizing 95 to 35 parts by weight of a monomer mixture consisting of 10 to 70% by weight of a maleimide compound, 25 to 80% by weight of an aromatic alkenyl compound, 5 to 40% by weight of an alkenyl cyanide compound and 0 to 50% by weight of a monomer copolymerizable with said compounds, in the presence of 5 to 65 parts by weight of at least one rubber-like polymer selected from the group consisting of an ethylene-propylene-nonconjugated diene rubber, an ethylene-propylene rubber and an acrylic rubber, and
   (C) 5 to 70% by weight of a styrene resin obtained by polymerizing 95 to 20 parts by weight of a monomer mixture consisting of 5 to 40% by weight of an alkenyl cyanide compound, 10 to 95% by weight of an aromatic alkenyl compound and 0 to 70% by weight of at least one other alkenyl monomer copolymerizable with said compounds, in the presence of 5 to 80 parts by weight of a rubbery polymer.

2. The composition according to claim 1, wherein the contents of the polycarbonate (A), the maleimide resin (B) and the styrene resin (C) are 30 to 70% by weight, 15 to 65% by weight and 10 to 65% by weight, respectively.

3. The composition according to claim 1, wherein the aromatic alkenyl compound is styrene, alpha-methylstyrene or both thereof and the alkenyl cyanide compound is acrylonitrile.

4. The composition according to claim 1, wherein the rubber-like polymer component is dispersed in the maleimide resin (B) in the form of particles having a weight-average particle diameter of 0.1 to 2 microns.

5. The composition according to claim 1, wherein the maleimide compound is at least one compound selected from the group consisting of N-methylmaleimide, N-ethylmaleimide, N-phenylmaleimide, N-o-chlorophenylmaleimide and N-cyclohexylmaleimide.

6. The composition according to claim 1, wherein the rubbery polymer component in the styrene resin (C) is at least one rubber selected from the group consisting of ethylene-propylene-nonconjugated diene terpolymers, acrylic rubbers and diene rubbers.

* * * * *